United States Patent [19]

Kubomura et al.

[11] Patent Number: 5,122,210
[45] Date of Patent: Jun. 16, 1992

[54] PROCESS FOR PRODUCING A BICYCLE FRAME MADE OF FIBER-REINFORCED PLASTICS

[75] Inventors: Kenji Kubomura; Hironori Maikuma; Nobuyuki Tsuji; Hiromi Kimura, all of Kawasaki; Toshikazu Takeda, Tokyo, all of Japan

[73] Assignees: Nippon Steel Corporation; Nippon Steel Chemical Co., Ltd., both of Tokyo, Japan

[21] Appl. No.: 539,143

[22] Filed: Jun. 18, 1990

[30] Foreign Application Priority Data

Jun. 19, 1989 [JP] Japan ................. 1-156616
Jun. 19, 1989 [JP] Japan ................. 1-156617

[51] Int. Cl.$^5$ ............................................. B29C 41/00
[52] U.S. Cl. ......................................... 156/78; 156/79; 156/245; 156/294
[58] Field of Search ............... 156/78, 79, 293, 294, 156/245

[56] References Cited

U.S. PATENT DOCUMENTS

| | | |
|---|---|---|
| 3,833,242 | 9/1974 | Thompson, Jr. |
| 4,231,825 | 11/1980 | Carter ................. 156/79 |
| 4,437,257 | 3/1984 | Kluge . |
| 4,474,635 | 10/1984 | Adams . |
| 4,541,649 | 9/1985 | Grunfeld .............. 29/527.5 |
| 4,657,795 | 4/1987 | Foret . |
| 4,850,607 | 7/1989 | Trimble . |

FOREIGN PATENT DOCUMENTS 61-163076 7/1986 Japan .
01763 5/1983 PCT Int'l Appl. .
04789 6/1989 PCT Int'l Appl. .

Primary Examiner—Jill L. Heitbrink
Attorney, Agent, or Firm—Cushman, Darby & Cushman

[57] ABSTRACT

A process for producing a bicycle frame of a fiber-reinforced plastics (FRP) including the steps of: forming parts of a bicycle frame such as an upper pipe, a lower pipe, a vertical pipe, a chain stay and a rear fork, or a combination thereof, with an FRP; arranging the bicycle frame parts in a structure of the bicycle frame; forming, with an FRP, lug portions onto the arranged bicycle frame parts at a required position whereat the bicycle frame parts are to be connected and fixed to each other; and curing all of the lug portions at one time, to thereby simultaneously accomplish an assembling of the bicycle frame. A process for forming a lug portion of a FRP bicycle is disclosed which includes the steps of: providing a female mold with a cavity having a shape of a final lug portion; disposing a flexible sheet on a surface of the cavity; arranging frame parts in a structure of a bicycle frame; arranging the female mold at a lug portion of the arranged bicycle frame parts; supplying and foaming a foaming material in the female mold at the lug portion; removing the female mold to leave an assembly of the frame parts with a foamed body; removing the flexible sheet from the female mold; laminating a foaming sheet and then a prepreg of resin-impregnated continuous fibers onto the foamed body; arranging the female mold over the laminated prepreg; and heating to cure the resin while foaming the foaming sheet, to thereby form the lug portion of the FRP bicycle frame.

7 Claims, 8 Drawing Sheets

PROCESS FOR PRODUCING A BICYCLE FRAME MADE OF FIBER-REINFORCED PLASTICS

BACKGROUND OF THE INVENTION

1. Field of the Invention

The present invention relates to a process for producing a bicycle frame made of a fiber-reinforced plastics (FRP), using resin-impregnated continuous-fibers (prepreg).

2. Description of the Related Art

In general, bicycle frames are produced by welding metal pipes of, for example, iron-based materials, aluminum and titanium, but recently, bicycle frames of FRP pipes using carbon fibers or aramide fibers are produced, to produce a higher-quality or to lighten the weight of the bicycle frame.

The structure of an FRP pipe bicycle frame comprises FRP pipes and metal joints or lugs bonded together by an adhesive, but FRP frames using FRP lugs are considered most preferable when attempting an optimum lightening of or obtaining required frame characteristics, e.g., mechanical strength and rigidity, best suited to a particular usage. Accordingly, various processes for forming FRP bicycle frames have been and are being used.

The processes for forming FRP bicycle frames can be classified into two groups, i.e., bonding FRP pipes and FRP lugs with an adhesive (divisional forming process), and a simultaneous forming of the entire frame (simultaneous forming process) (Plastic Age, June 1988, pp. 134-140), but in all of these processes, currently a metal member must be inserted in a lug at a part of a front fork stem or a rear wheel, etc., and connected with another member.

In the divisional forming process, the pipes and lugs of a bicycle frame are first separately made, thereby facilitating control of the thickness of the part at respective portions and allowing a lightening of the weight. Nevertheless, these separately made pipes and lugs must be bonded by an adhesive, and thus a high level bonding technique is required and it is difficult to obtain a sufficient strength at the bonded portions.

A sufficient strength can be obtained by the simultaneous forming process, as there are no bonded portions of the pipes and lugs. This process is also considered promising when designing fashionable products, due to the high degree of design freedom. Nevertheless, a very high level forming technique is required when simultaneously forming a bicycle frame having a complex three-dimensional structure, and the productivity is very low. Further, a precise formation is particularly difficult, and thus a post processing such as grinding or polishing is required, which reduces the productivity as well as the mechanical strength and rigidity by cutting the fibers, and raising problems in the design from the viewpoint of the mechanical strength or rigidity of the frame. Further, since the frame size cannot be adjusted by cutting the forming pipes, as for a conventional frame, a mold is required for the entire frame for each frame size, which increases manufacturing costs.

Generally, when a complex part of an FRP is to be formed, one or usually more bodies of a foamed material are first arranged inside, a prepreg of resin impregnated continuous fibers is laminated thereon, a mold is set on the laminated prepreg, and a heat treatment is carried out for casing.

A lamination or winding-on of a prepreg of resin impregnated continuous fibers may be adopted to form a lug having a desired shape, but the material thereof is generally expensive and the workability is low. A cheap foam is used for solving the above problems. Nevertheless, in such a conventional process, an already foamed material must be disadvantageously machined to a desired shape, and when one or more foamed bodies are to be arranged outside a joint portion of a frame part from the viewpoint of reinforcement or aesthetics, spaces are formed between the joint and the foamed body and between the foamed bodies and times and works are consumed to fill the spaces.

SUMMARY OF THE INVENTION

The object of the present invention is to provide a process for forming a bicycle frame made of FRP pipes and lugs, by which a high strength and a large degree of design freedom are obtained at a high productivity and a low cost, and changes of a frame size are not difficult.

The other object of the present invention is to provide a process for forming a lug having a complex shape. Particularly, a simplification of later steps is intended by obtaining of later steps is intended by obtaining a foamed body having a near final shape.

The above and other objects and features of the present invention are attained by a process for producing a bicycle frame of a fiber-reinforced plastics (FRP), comprising the steps of: forming parts of a bicycle frame such as an upper pipe, a lower pipe, a vertical pipe, a chain stay and a rear fork or a combination thereof with an FRP; arranging the bicycle frame parts in the form of a structure of the bicycle frame; forming, with an FRP, lug portions on the arranged bicycle frame parts at positions where the bicycle frame parts are to be connected and fixed to each other; and curing all of the lug portions at one time, to thereby accomplish a simultaneous assembly of the bicycle frame.

Namely, in the present invention, a simultaneous forming of an entire frame having a complex shape is not adopted; instead, the respective frame parts are formed separately and then lugs are formed, which eliminates the need for a high level forming technique and improves the productivity. Since the forming of the respective frame parts is easy, a control of the thickness and the aesthetic appearance, as well as a lightening of the weight, are easy. Further, since the frame size can be adjusted by cutting the forming pipes when the frame is to be formed, as in the divisional forming process, a precise control of the frame size according the user's requirements can be achieved. Also, the manufacturing cost is lowered because an entire frame size mold is no longer needed for each frame size.

The lug portions are formed by laminating a prepreg, i.e., resin-impregnated fibers, onto the frame parts or already cured pipes followed by curing by pressing and heating same. Accordingly, the adhesion thereof is stronger than that obtainable by the divisional forming process, in which separately cured parts are bonded together with an adhesive, and further, a special bonding technique is not needed. Furthermore, the degree of design freedom is high and the bonding area can be enlarged.

Therefore, according to the present invention, the drawbacks of the divisional and simultaneous forming processes, i.e., an insufficient bonding strength and a limited design freedom of the divisional forming process and a low productivity, high cost and a limited freedom of choice of frame size of the simultaneous forming process, can be removed.

In the present invention, a foam or resin may be provided around parts containing a lug around a metal part to be inserted in the lug and around a prepreg connecting the parts and metal part, which allows a lug having a desired shape to be formed.

In accordance with the present invention, there is also provided a process for forming a lug portion of a FRP bicycle frame, comprising the steps of: providing a female mold with a cavity having a shape of a final lug portion; disposing a flexible sheet on a surface of the cavity; arranging frame parts in the form of a structure of a bicycle frame; arranging the female mold at a lug portion of said arranged bicycle frame parts; supplying and foaming a foaming material in the female mold at said lug portion; removing the female mold to leave an assembly of the frame parts having a foamed body; removing the flexible sheet from the female mold; laminating a foaming sheet and then a resin-impregnated continuous fibers sheet onto the foamed body; arranging the female mold over the laminated resin-impregnated continuous fibers sheet; and heating to cure the resin while foaming the foaming sheet, to thereby form the lug portion of the FRP bicycle frame.

The female mold having a cavity in a final shape of a lug portion is usually made of a rigid material such as a metal or an FRP, and preferably is a dividable mold to facilitate demolding.

The foamed body is made from a foaming material, to enable a curved surface to be easily formed and to reduce the need for the inclusion of expensive reinforcing fibers. The material of the foaming material is not limited and may be a conventional material; for example, polyurethane is considered suitable.

The flexible sheet should be flexible to a degree such that the sheet can conform to the curved surface of the mold cavity, such as a sheet of wax, etc., and preferably has a thickness of 1-3 mm. Preferably the thickness is the same as the final thickness of the later laminated FRP sheet, to ensure a smooth outer surface of the final product after the curing of the laminated resin-impregnated continuous fibers sheet in the tightened mold, while foaming same in the mold, and to ensure a precise sizing of the product.

The resin-impregnated continuous fibers sheet used is an FRP sheet of continuous fibers of, e.g., carbon, an organic material, or glass, impregnated with a thermosetting resin such as an epoxy or an unsaturated polyester.

The foaming sheet is preferably a synthetic resin sheet which is foamed and cured by heating, to force the resin impregnated continuous fibers from the inside toward the outside of the rigid mold, which cooperates with the externally applied force from the tightened mold. To this end, for example, an epoxy-based adhesive film is considered suitable. To laminate the foaming sheet, preferably an adhesive is coated on the surface of the sheet or the sheet itself is adhesive, although the presence or absence of the adhesivity of the sheet is not critical.

In accordance with the present invention, a bicycle frame of any size may be made with a high degree of design freedom, the productivity is increased, and a remarkable lightening of the weight of the frame can be obtained. Further, a lug portion having a complex three-dimensional shape can be rapidly and easily formed and can have a highly reliable strength and rigidity.

BRIEF DESCRIPTION OF THE DRAWINGS

FIG. 7 shows the forming of an entire bicycle frame;

FIG. 8 is an enlarged view of a head lug portion;

FIG. 9 is a perspective view of a mold for a head lug portion; and

FIG. 10 is a perspective view of a finished shape of the head lug portion.

DESCRIPTION OF THE PREFERRED EMBODIMENTS

Figure 1:
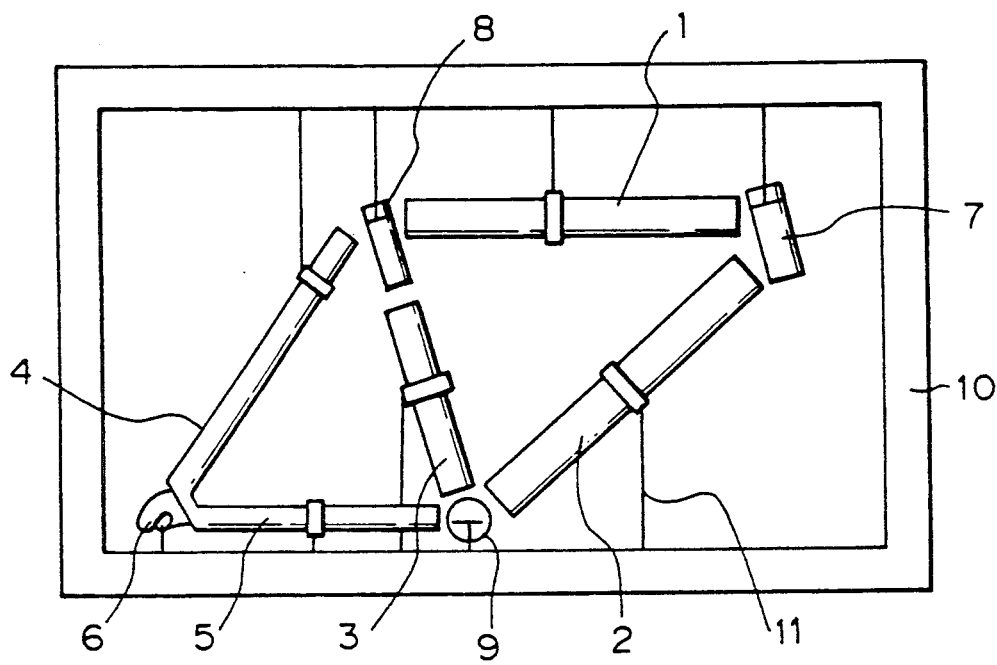
FIG. 1 is a schematic diagram of the forming of an entire bicycle frame.

FIG. 1 shows the forming of an entire bicycle frame. Note, parts such as an upper pipe 1, a lower pipe 2, a vertical pipe 3, a rear fork 4, a chain stay 5 and others are respectively preformed from an FRP. This forming can be carried out by any conventional pipe forming process, such as filament winding, sheet winding, inside pressure forming or the like. A pipe may be solid and the inside thereof filled with a foam, from the viewpoint of the forming operation or of the characteristics such as strength and rigidity. The pipes need not be formed separately; for example, a combination of the rear fork 4, the chain stay 5 and a rear hook may be formed as one body.

The pipes 1-5, the rear hook 6, a head pipe 7, a seat pipe 8, and a hanger lug 9 are fixed in a predetermined arrangement with a jig 10. The vertical pipe 3 has a cross section as shown in FIG. 5, i.e., not a true circle. The rear hook 6, head pipe 7, seat pipe 8 and hanger lug 9 are metal members preformed of, e.g., aluminum, to a predetermined shape and size. These metal members 6-9 are preferably made of a metal, owing to the need for thread machining or for a high mechanical strength or a durability, since they must be fitted to other parts such as a front fork stem and a rear wheel, but other materials such as FRP may be used where possible. The pipes 1-5 may be cut from a long pipe or originally formed into a short pipe having a required length. The jig 10 is not limited in shape, material, and fixing method, etc., thereof, as long as it precisely fixes the members 6-9, but preferably the jig 10 has a structure in which a size adjustment and a lug forming operation are facilitated, to ensure a better workability, and is made of a material having a low coefficient of thermal expansion, to ensure a precise sizing of the entire frame.

These arranged metal members and pipes are connected with a prepreg by laminating the prepreg thereon while taking into consideration the required strength or rigidity. Then the prepreg cured by pressing and heating, whereby lug portions are formed. In this case, the step of forming of the lug portions is included in the step of forming the frame, thus shortening the number of steps required. Also, since an uncured prepreg is laminated and bonded to cured pipes, the pressing thereto of a bonded portion is easy, and a bonding having a higher bonding force and reliability is obtained, in comparison with the bonding between cured members of the divisional forming process.

Figure 2:
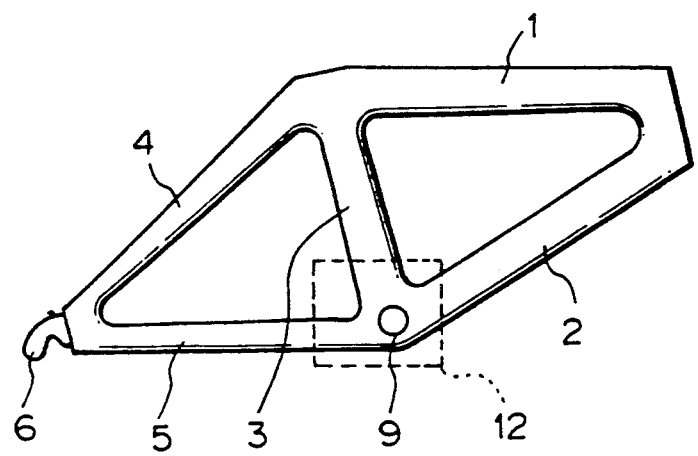
FIG. 2 is a front view of a formed bicycle frame.
Figure 3:
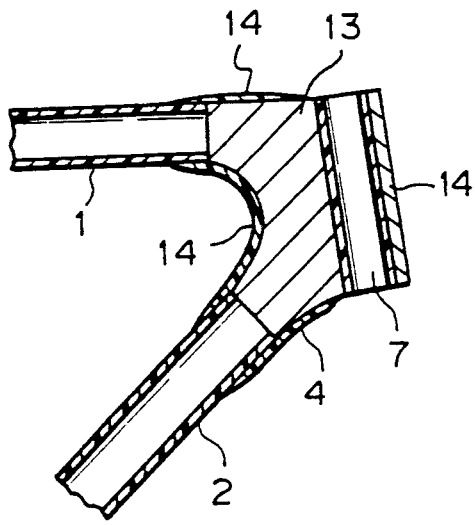
FIG. 3 is a schematic diagram of the forming of a head lug portion of a bicycle frame.
Figure 4:
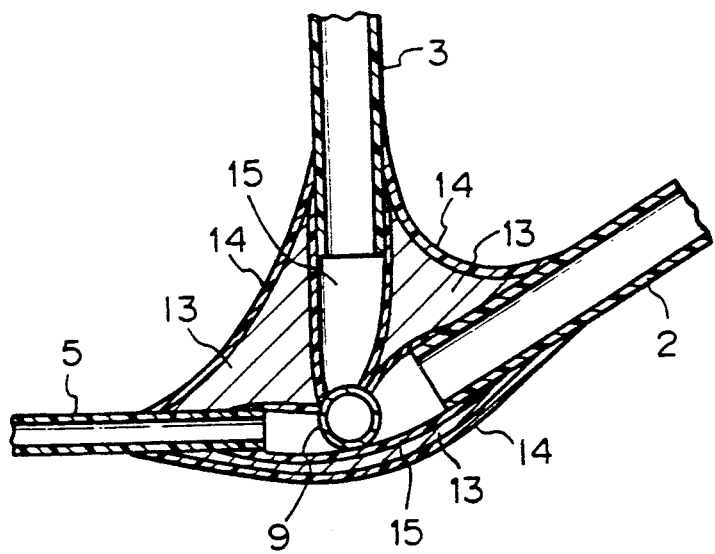
FIG. 4 is a schematic diagram of the forming of a hanger lug portion of a bicycle frame.

Although the above forming process limits the shape of the lug portion to some extent, a lug portion having a desired shape may be formed by providing a filling body of a foam or resin 13 around the pipes 1 and 2 and the metal member 7, laminating a prepreg 14 satisfying a required strength and rigidity thereon, and then curing the prepreg by pressing and heating. As a result, a bicycle frame having a design as shown in FIG. 2, for example, can be formed. The shape of the filling body may be made with a female mold having a cavity of a desired shape or by cutting a bulk to a desired shape. The filling body may be formed at the required position or arranged at the position after the body is separately formed. The filling body may be any material that will withstand a temperature such as the temperature for curing the prepreg, and a foaming polyurethane and an epoxy resin, etc., may be used.

Preferably, the filling body is a foam, but a foam does not transmit a force applied to a metal member, and as a result, if a contact area of a lug-defining FRP with a metal member is small, due to the structure thereof, for example, the hanger lug portion shown in FIG. 2, a stress concentration on the FRP occurs at a portion in contact with the metal member, and thus the durability of the frame is lowered. This drawback may be resolved by first bonding the pipes 2, 3 and 5 and the metal member 9 with a prepreg 15, providing a foam body 13 around the bonded assembly, and then providing (laminating, then curing by pressing and heating) a prepreg 14 thereon to satisfy the required strength and rigidity. In this case, the force applied to the metal member 9 is effectively transmitted to the entire frame through the pipes 2, 3 and 5, to thereby prevent such a stress concentration. The prepreg 15 between the pipes and metal member may be cured prior to the providing of the foam body or may be fitted in the uncured state, since, even if the prepreg 15 is uncured, it will be cured during a heating of the whole lug portion for curing the outer prepreg 14. This type of formation of a lug portion, i.e., a provisional bonding of a pipe and metal member with a prepreg, may be adopted for all lug portions or only for certain lug portions in the bicycle frame.

The reinforcement fiber and resin used for the pipes and lug portions may be any one normally used for an FRP; the reinforcement fiber can include carbon fibers, aramide fibers and glass fibers, and the resin can include an epoxy resin, an unsaturated polyester resin, and a polyimide resin.

An particularly suitable embodiment of the process for forming a lug portion having a relatively complex structure is now described with reference to the drawings.

Figure 6A:
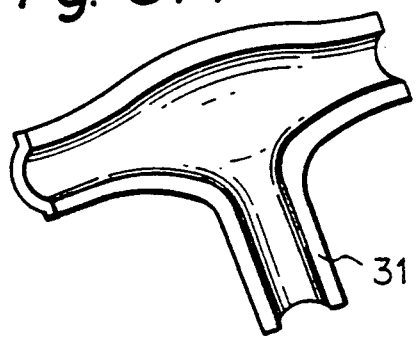
FIGS. 6A to 6E show the steps of forming a lug portion of an FRP.
Figure 6B:
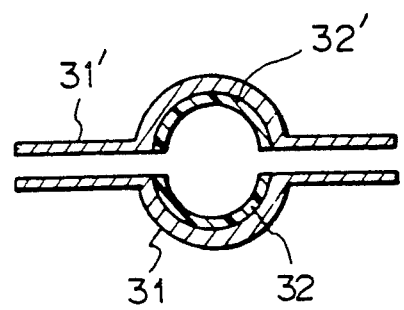
Figure 6C:
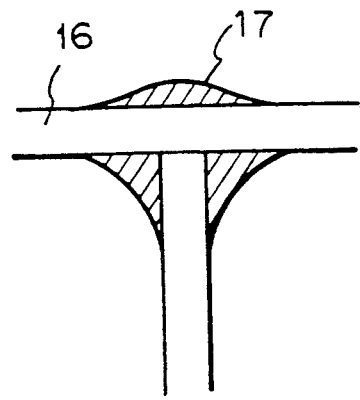
Figure 6D:
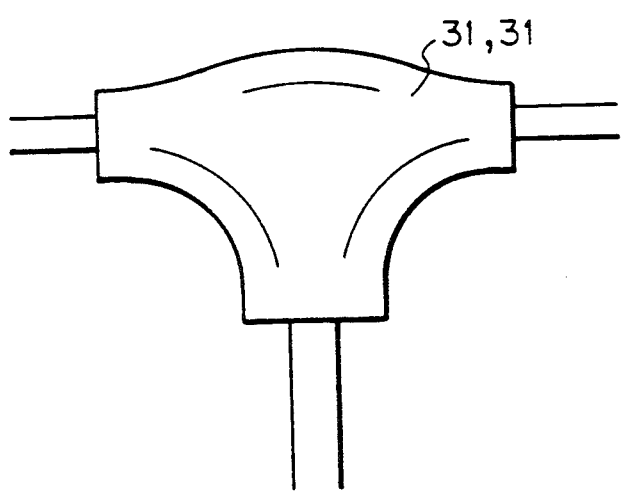
Figure 6E:
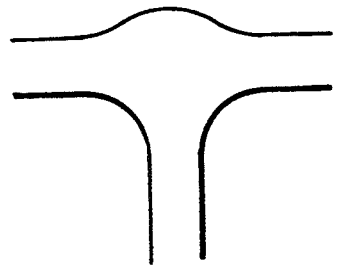

As shown in FIG. 6A, half molds 31 and 31' having a cavity corresponding to the final product shape are prepared, and flexible sheets 32 and 32' are fitted to the inner surface of the half molds 31 and 31' as shown in FIG. 6B. The half mold 31 is arranged at a portion at which the product is to be formed, and a foaming material is supplied thereto, and the other half mold 31' is arranged over and tightly fastened thereto. Alternatively, both half molds 31 and 31' are first arranged and tightly fixed together at the required portion and then a foaming material is supplied thereto. Thereafter, the foaming material is cured, the molds 31 and 31' are separated, and the flexible sheets 32 and 32' are removed from the molds 31 and 31'. After the separation of the mold 31 and 31', a formed assembly having a section as shown in FIG. 6C, is obtained as a foamed body 17 adhered around skeletons 16. Next, a foaming sheet and a prepreg (resin-impregnated continuous fibers) are successively laminated or wound onto the foamed body, and the half molds 31 and 31' are again joined and tightly fixed together as shown in FIG. 6D. The assembly is heated and the half molds 31 and 31, are then separated, and thus a final lug portion product as shown in FIG. 6E is obtained.

An example of forming a bicycle frame is now described with reference to the drawings.

Referring to FIG. 1, the metal members 6–9 were made of aluminum, and the pipes 1–3 were formed of unidirectional- and woven-prepregs of epoxy resin-impregnated carbon fibers by an inner pressure forming process. The upper pipe 1 was cut from a pipe having a cross section shown in FIG. 5A and a thickness of 1 mm, to a length of 650 mm; the lower pipe 2 was cut from a pipe having a cross section shown in FIG. 5B and a thickness of 1 mm, to a length of 750 mm; and the vertical pipe 3 was cut from a pipe having a cross section shown in FIG. 5C and a thickness of 1 mm, to a length of 550 mm. A chain stay 4 and a rear fork 5 were formed in one step together with a rear hook 6. This member was formed by using a foamed polyurethane as a core, laminating unidirectional and woven prepregs of epoxy resin-impregnated carbon fibers thereon, and curing the whole by heating. This member was formed as a pair of right and left side members. The chain stay 4 had a cross section shown in FIG. 5D and an FRP thickness of 1 mm, and a length of 400 mm, and the rear fork 5 had a cross section shown in FIG. 5E and an FRP thickness of 1 mm, and a length of 550 mm.

Figure 5A:
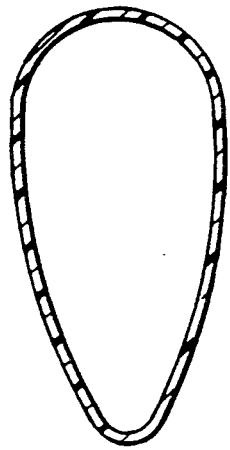
FIGS. 5A-5E are sectional views of FRP pipes.
Figure 5B:
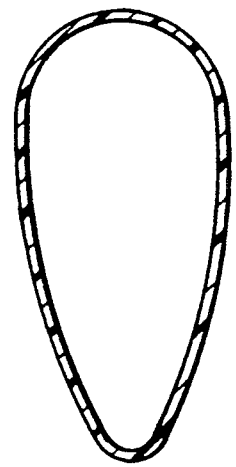
Figure 5C:
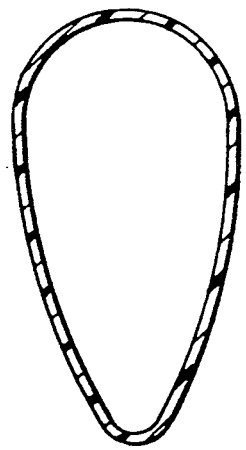
Figure 5D:
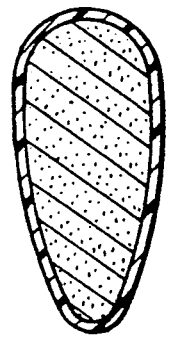
Figure 5E:
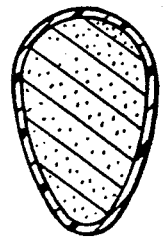

The exemplary maximum vertical and horizontal dimensions in FIGS. 5A are 58 mm and 28 mm, respective; in FIG. 5B, 60 mm and 28 mm; in FIGS. 5C, 58 mm and 30 mm; in FIG. 50, 43 mm and 20 mm; and FIG. 5E, 30 mm and 20 mm.

Then, the pipes 1–5 and metal members 6–9 were fixed with a cramp 11 in a jig 10, and the hanger lug 9, lower pipe 2, vertical pipe 3, and chain stay 5 were connected and fixed thereto with a woven prepreg 15 of epoxy resin-impregnated carbon fibers. Similarly, the upper pipe 1, vertical pipe 3, and rear pipe 4 were connected and fixed thereto with a woven prepreg 15 of epoxy resin-impregnated carbon fibers. Then, foamed polyurethanes 13, previously formed by a gypsum mold into a required shape, were arranged at a required position of respective lug portions, unidirectional- and woven-prepregs 14 of epoxy resin-impregnated carbon fibers were laminated to a thickness of 1 mm on foamed polyurethanes 13, and the whole was heated at 120° C. in an oven for 2 hours to cure the prepreg, whereby a bicycle frame was formed.

The obtained bicycle frame had an almost ideal thickness at the pipes and lug portions, meeting the required strength and rigidity, and had a weight of 1200 grams, which is lighter than not only metal type but also conventional FRP pipes type bicycle frames.

The forming of a lug portion of the bicycle frame is further described in more detail, with reference to the drawings.

Figure 7:
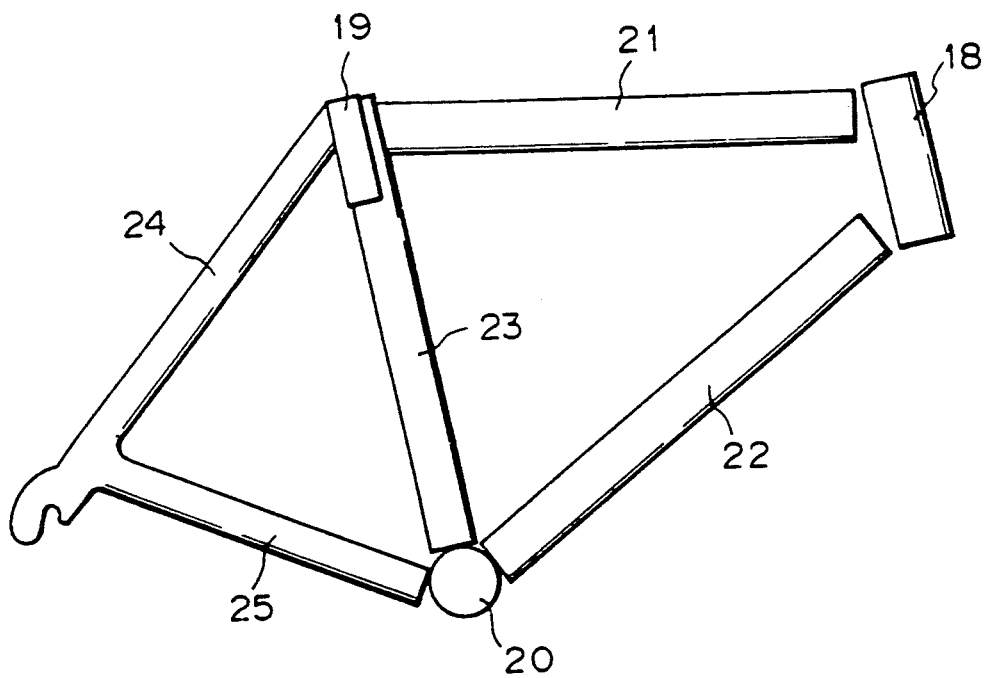
FIGS. 7 to 10 show the forming of a head lug portion of a bicycle frame.
Figure 8:
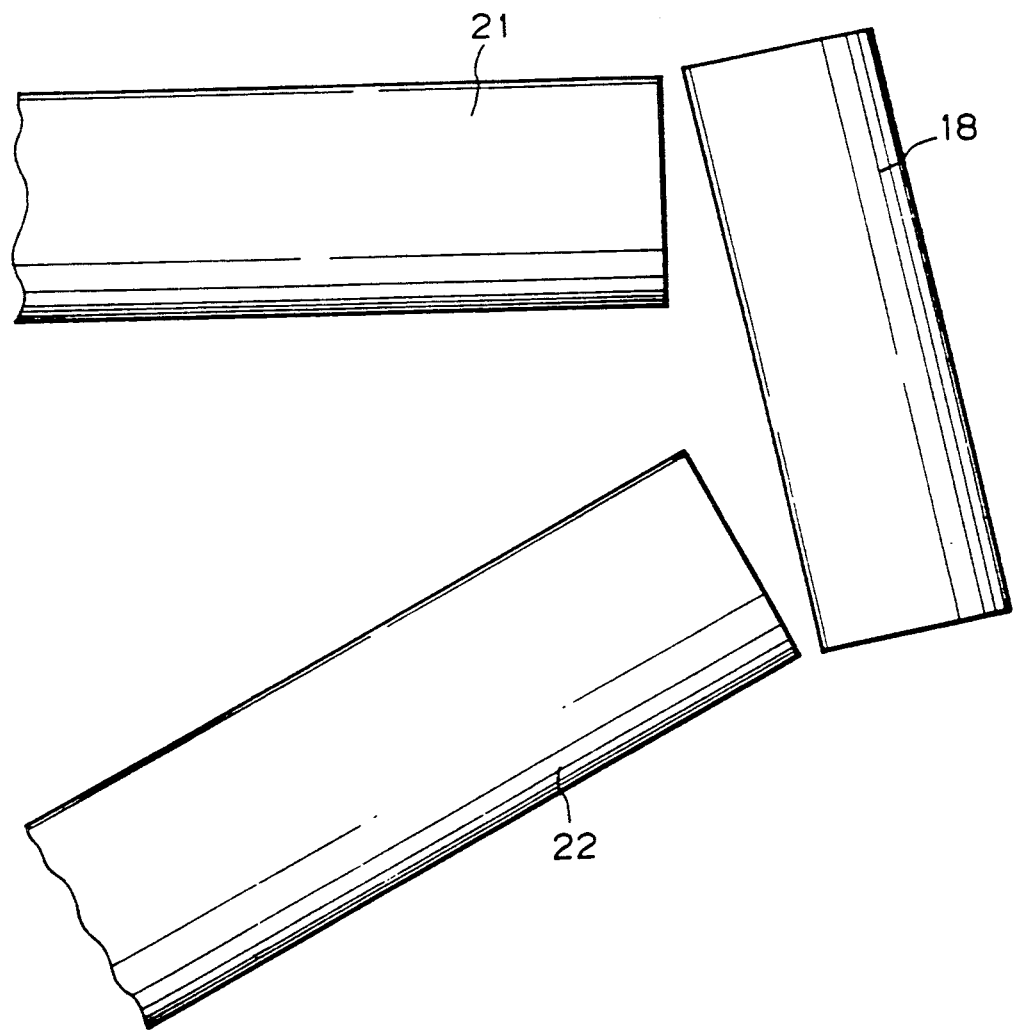
Figure 9:
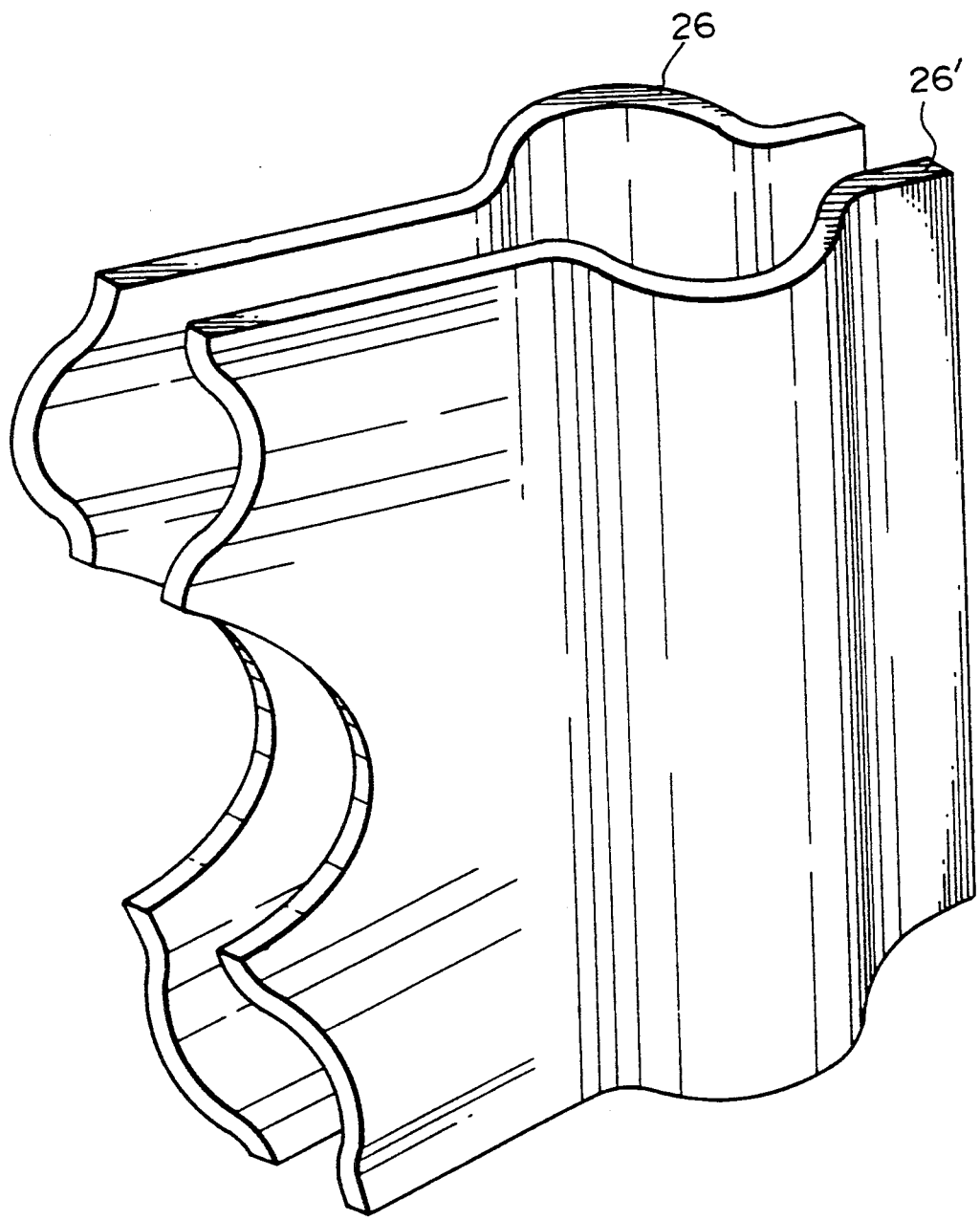
Figure 10:
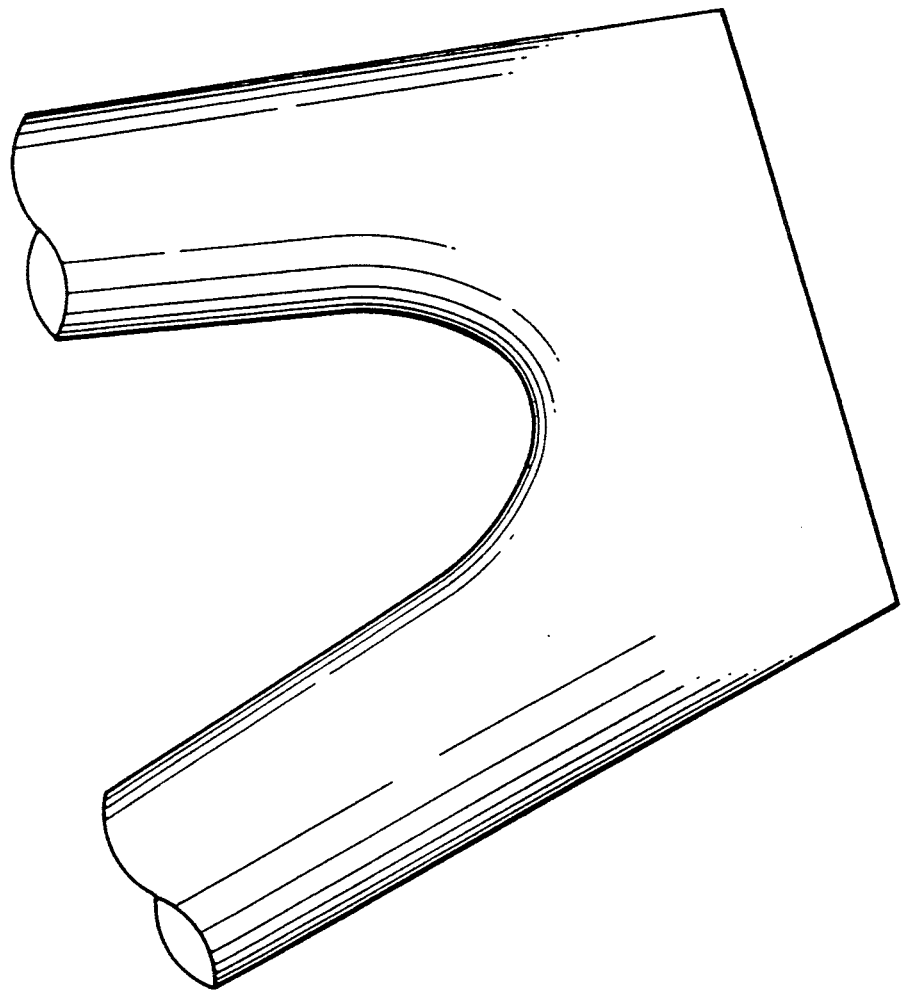

FIG. 7 illustrates a skeleton of a bicycle frame, including metal pipes 18–20 and continuous carbon fiber-reinforced plastic pipes 21–25 fixed by a jig, and FIG. 8 shows an enlarged view of a head lug portion shown in FIG. 7. A wooden model of the head lug portion having a final product shape is made, and female molds (half molds) 26 and 26, of a continuous carbon fiber-reinforced plastic, as shown in FIG. 9, are prepared by using the wooden model. A wax sheet having a thickness of 3 mm, as a flexible sheet, is arranged on the inner surface of the female molds 26 and 26', and then the female mold 26 with the wax sheet is arranged at a required position of the skeleton and a polyurethane foaming material is poured therein. Thereafter, the other female mold 26' is tightly fixed to the female mold 26, and after foaming and curing the foaming material, the molds 26 and 26' are separated and a foamed body having a shape close to the final product of the lug portion is obtained. The wax sheets are then removed from the molds, and an epoxy based foaming adhesive sheet having a thickness of about 2 mm, and a prepreg of a continuous carbon fiber-reinforced plastic are laminated onto the above foamed body and the molds 26 and 26' are again tightly fixed together. Then, a heat treatment is carried out at 120° C. for 2 hours, for the curing, and the molds 26 and 26, are again separated. By these steps, a part having a complex three-dimensional shape as shown in FIG. 10 is easily manufactured, and thus a structure of a bicycle frame having a complex curved and smooth surface is obtained.

We claim:

1. A process for producing a bicycle frame of fiber-reinforced plastic, comprising the steps of:
    forming parts of a bicycle frame from fiber-reinforced plastic;
    arranging said pre-formed bicycle frame parts together with metal members in a configuration of the bicycle frame;
    forming, from uncured fiber-impregnated plastic and foamed plastic, lug portions onto the arranged bicycle frame parts at a required position where said bicycle frame parts are to be connected and fixed to each other; and
    curing all said lug portions at one time to thereby simultaneously complete assembly of the bicycle frame.

2. A process according to claim 1 wherein a lug portion among said lug portions if formed by providing a foam or resin body around predetermined bicycle frame parts among said bicycle frame parts at said lug portion, and laminating a prepreg of resin-impregnated fibers on said foam or resin body.

3. A process according to claim 1 wherein a lug portion among said lug portions is formed by first bonding predetermined bicycle frame parts among said bicycle frame parts with a first prepreg of resin-impregnated fibers, providing a foam or resin body around said bonding first prepreg, and laminating a second prepreg of resin-impregnated fibers on said foam or resin body.

4. A process according to claims 2 or 3, wherein said bicycle frame parts made of a prepreg include a metal member at the lug portion.

5. A process as in claims 1 or 2, wherein said step of forming parts comprises forming an upper pipe, a lower pipe, a vertical pipe, two rear forks, and two chain stays and wherein said step of arranging metal members comprises arranging a head pipe, a seat pipe, a hanger lug, and rear hooks.

6. A process as in claims 1 or 2, wherein said step of arranging said bicycle frame parts together with metal members comprises arranging said bicycle frame parts and said metal members by means of a jig.

7. A process for forming a lug portions of fiber-reinforced plastic bicycle frame, comprising the steps of:
    providing a female mold with a cavity having a shape of a final lug portion;
    disposing a flexible sheet on a surface of the cavity;
    arranging pre-formed bicycle frame parts together with metal members in a configuration of a bicycle frame;
    arranging the female mold at a lug portion of said arranged bicycle frame parts;
    supplying and foaming a foaming material in the female mold at said lug portions;
    removing the female mold to leave an assembly of the frame parts with a foamed body;
    removing the flexible sheet from the female mold;
    laminating a foaming sheet and then a prepreg of resin-impregnated continuous fibers onto the foamed body;
    arranging the female mold over the laminated prepreg; and
    heating to cure the resin while foaming the foaming sheet to thereby form the lug portion of the fiber-reinforced plastic bicycle frame.

* * * * *